US012645451B2

(12) United States Patent
　　　Small

(10) Patent No.:　US 12,645,451 B2
(45) Date of Patent:　Jun. 2, 2026

(54) SYSTEMS AND METHODS FOR DETERMINING OUT OF DATE STATUS BASED ON CORPUS OF DEVICES

(71) Applicant: Cisco Technology, Inc., San Jose, CA (US)

(72) Inventor: Robert Jacob Linial Small, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 18/061,586

(22) Filed: Dec. 5, 2022

(65) Prior Publication Data

US 2024/0184568 A1　Jun. 6, 2024

(51) Int. Cl.
　　*G06F 8/71*　　(2018.01)
(52) U.S. Cl.
　　CPC ...................................... *G06F 8/71* (2013.01)
(58) Field of Classification Search
　　CPC ...................................... G06F 8/71; G06F 9/44
　　See application file for complete search history.

(56) References Cited

U.S. PATENT DOCUMENTS

| | | | |
|---|---|---|---|
| 2006/0174242 A1 | 8/2006 | Zhu et al. | |
| 2006/0230395 A1 | 10/2006 | Paul et al. | |
| 2008/0082657 A1* | 4/2008 | Hart .................... | H04L 43/0817 |
| | | | 709/224 |
| 2009/0319848 A1 | 12/2009 | Thaper | |

| | | | |
|---|---|---|---|
| 2010/0167763 A1* | 7/2010 | Bouthemy .............. | H04L 45/16 |
| | | | 455/466 |
| 2011/0307582 A1* | 12/2011 | Iwaya ........................ | G06F 8/61 |
| | | | 709/219 |
| 2012/0192173 A1* | 7/2012 | Price ......................... | G06F 8/65 |
| | | | 717/172 |
| 2013/0114422 A1* | 5/2013 | Clark ................ | H04N 21/26216 |
| | | | 370/252 |
| 2015/0128126 A1 | 5/2015 | Brunet et al. | |

(Continued)

FOREIGN PATENT DOCUMENTS

| | | |
|---|---|---|
| CN | 105426193 A | 3/2016 |
| EP | 2993582 A1 | 3/2016 |

OTHER PUBLICATIONS

International Search Report and Written Opinion for International Application No. PCT/US2023/081987, mailed Mar. 5, 2024, 12 Pages.

*Primary Examiner* — Qing Chen
(74) *Attorney, Agent, or Firm* — Baker Botts L.L.P.

(57) ABSTRACT

In one embodiment, a method includes receiving information associated with a plurality of devices. The information includes a manufacturer, a model name, and a current version of software for each of the plurality of devices. The method also includes generating a plurality of classifications. Each of the plurality of classifications is associated with a particular manufacturer and a particular model name. The method further includes determining a number of the plurality of devices in a first classification of the plurality of classifications, categorizing the number of the plurality of devices in the first classification into a plurality of categories by the current version of software, and determining, independent of any type of device identifier, a latest available version of software for the first classification.

17 Claims, 4 Drawing Sheets

*Database table 200*

| Category 148 | Manufacturer 122 | Model Name 124 | Software 126 | Version 128 | Number of Devices 120 | Classification 146 | Latest Available Version 150 |
|---|---|---|---|---|---|---|---|
| 148a | 122a (Apple Inc.) | 124a (IPhone 14) | 126a (iOS) | 128a (16.0) | 4 | 146a | 148a (16.03) |
| 148b | 122a (Apple Inc.) | 124a (IPhone 14) | 126a (iOS) | 128b (16.01) | 15 | | |
| 148c | 122a (Apple Inc.) | 124a (IPhone 14) | 126a (iOS) | 128c (16.02) | 58 | | |
| 148d | 122a (Apple Inc.) | 124a (IPhone 14) | 126a (iOS) | 128d (16.03) | 121 | | |
| 148e | 122a (Apple Inc.) | 124a (IPhone 14) | 126a (iOS) | 128e (16.1) | 2 | | |
| ••• | 122a (Apple Inc.) | ••• | ••• | ••• | ••• | ••• | |
| 148f | 122b (Samsung Electronics) | 124b (Galaxy S22) | 126b (Android) | 128f (Android 12) | 51 | 146b | 148b (Android 13) |
| 148g | 122b (Samsung Electronics) | 124b (Galaxy S22) | 126b (Android) | 128g (Android 13) | 49 | | |
| ••• | 122b (Samsung Electronics) | ••• | ••• | ••• | ••• | ••• | ••• |
| ••• | ••• | ••• | ••• | ••• | ••• | ••• | ••• |
| ••• | ••• | ••• | ••• | ••• | ••• | ••• | ••• |
| 148n | 122n | 124n | 126n | 128n | ••• | 146n | 148n |

(56) References Cited

U.S. PATENT DOCUMENTS

| | | | |
|---|---|---|---|
| 2015/0339113 A1* | 11/2015 | Dorman | H04L 67/10 |
| | | | 717/169 |
| 2016/0378454 A1* | 12/2016 | Nekrestyanov | G06F 8/65 |
| | | | 717/170 |
| 2017/0102934 A1 | 4/2017 | Xu | |
| 2018/0018161 A1 | 1/2018 | Gattu et al. | |
| 2019/0250898 A1* | 8/2019 | Yang | H04W 12/08 |
| 2020/0371772 A1* | 11/2020 | Rodriguez Bravo | G06F 8/71 |
| 2021/0258124 A1* | 8/2021 | Agardh | H04L 5/0055 |
| 2023/0049989 A1* | 2/2023 | Franc De Ferriere | G06Q 10/02 |

* cited by examiner

Database table 200

| Category 148 | Manufacturer 122 | Model Name 124 | Software 126 | Version 128 | Number of Devices 120 | Classification 146 | Latest Available Version 150 |
|---|---|---|---|---|---|---|---|
| 148a | 122a (Apple Inc.) | 124a (IPhone 14) | 126a (iOS) | 128a (16.0) | 4 | | |
| 148b | 122a (Apple Inc.) | 124a (IPhone 14) | 126a (iOS) | 128b (16.01) | 15 | | |
| 148c | 122a (Apple Inc.) | 124a (IPhone 14) | 126a (iOS) | 128c (16.02) | 58 | 146a | 148a (16.03) |
| 148d | 122a (Apple Inc.) | 124a (IPhone 14) | 126a (iOS) | 128d (16.03) | 121 | | |
| 148e | 122a (Apple Inc.) | 124a (IPhone 14) | 126a (iOS) | 128e (16.1) | 2 | | |
| ••• | 122a (Apple Inc.) | ••• | ••• | ••• | ••• | ••• | |
| 148f | 122b (Samsung Electronics) | 124b (Galaxy S22) | 126b (Android) | 128f (Android 12) | 51 | 146b | 148b (Android 13) |
| 148g | 122b (Samsung Electronics) | 124b (Galaxy S22) | 126b (Android) | 128g (Android 13) | 49 | | |
| ••• | 122b (Samsung Electronics) | | | ••• | ••• | ••• | ••• |
| ••• | ••• | ••• | ••• | ••• | ••• | ••• | ••• |
| ••• | ••• | ••• | ••• | ••• | ••• | ••• | ••• |
| 148n | 122n | 124n | 126n | 128n | ••• | 146n | 148n |

*FIG. 2*

SYSTEMS AND METHODS FOR DETERMINING OUT OF DATE STATUS BASED ON CORPUS OF DEVICES

TECHNICAL FIELD

The present disclosure relates generally to communication networks, and more specifically to systems and methods for determining out-of-date status based on a corpus of devices.

BACKGROUND

As companies become more mobile-friendly, more and more employees are accessing confidential data via their mobile devices. Outdated operating systems on the employees' mobile devices can cause fragmentation. Outdated software may also pose serious security risks to confidential data. For example, outdated software is susceptible to certain malware that is designed to exploit vulnerabilities in bugs that have been fixed in the newer software versions.

BRIEF DESCRIPTION OF THE DRAWINGS

FIG. 2 illustrates a database table that may be used by the system of FIG. 1, in accordance with certain embodiments;

DESCRIPTION OF EXAMPLE EMBODIMENTS

Overview

Figure 1:
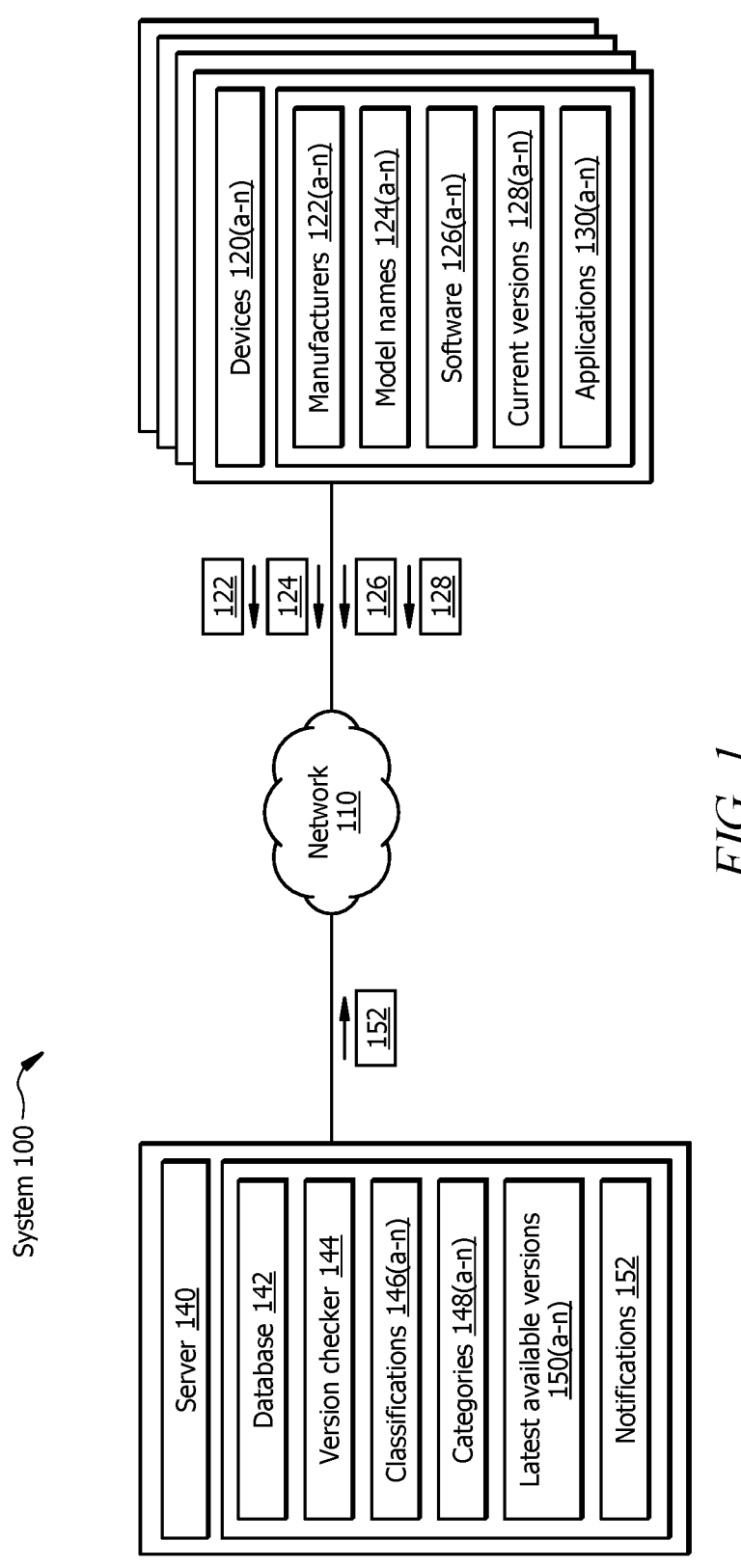
FIG. 1 illustrates a system for determining an out-of-date status based on a corpus of devices, in accordance with certain embodiments.

According to an embodiment, a network component includes one or more processors and one or more computer-readable non-transitory storage media coupled to the one or more processors and including instructions that, when executed by the one or more processors, cause the network component to perform operations. The operations include receiving information associated with a plurality of devices. The information may include a manufacturer, a model name, and a current version of software for each of the plurality of devices. The operations also include generating a plurality of classifications. Each of the plurality of classifications is associated with a particular manufacturer and a particular model name. The operations further include determining a number of the plurality of devices in a first classification of the plurality of classifications, categorizing the number of the plurality of devices in the first classification into a plurality of categories by the current version of software, and determining, independent of any type of device identifier, a latest available version of software for the first classification.

In certain embodiments, the operations include determining that the current version of software of a first device of the plurality of devices in the first classification is different than the latest available version of software. In some embodiments, the operations include communicating a notification to the first device indicating that the first device is out of date. In some embodiments, determining that the current version of software of the first device of the plurality of devices in the first classification is different than the latest available version of software is performed during authentication of the first device.

In certain embodiments, the operations include determining a number of the plurality of devices in a first category of the plurality of categories. The first category may represent a most recent current version of the current versions of software. In some embodiments, the operations include generating a comparison of the number of the plurality of devices in the first classification to the number of the plurality of devices in the first category, determining that the comparison is statistically significant, and/or determining that the most recent current version of software is the latest available version of software for the first classification.

In certain embodiments, the operations include determining, based on the information, that the plurality of devices is associated with different carriers. In some embodiments, the current version of software associated with each of the plurality of devices comprises one or more patch levels. In certain embodiments, the software is an operating system, a browser, or firmware.

According to another embodiment, a method includes receiving information associated with a plurality of devices. The information may include a manufacturer, a model name, and a current version of software for each of the plurality of devices. The method also includes generating a plurality of classifications. Each of the plurality of classifications is associated with a particular manufacturer and a particular model name. The method further includes determining a number of the plurality of devices in a first classification of the plurality of classifications, categorizing the number of the plurality of devices in the first classification into a plurality of categories by the current version of software, and determining, independent of any type of device identifier, a latest available version of software for the first classification.

According to yet another embodiment, one or more computer-readable non-transitory storage media embody instructions that, when executed by a processor, cause the processor to perform operations. The operations include receiving information associated with a plurality of devices. The information may include a manufacturer, a model name, and a current version of software for each of the plurality of devices. The operations also include generating a plurality of classifications. Each of the plurality of classifications is associated with a particular manufacturer and a particular model name. The operations further include determining a number of the plurality of devices in a first classification of the plurality of classifications, categorizing the number of the plurality of devices in the first classification into a plurality of categories by the current version of software, and determining, independent of any type of device identifier, a latest available version of software for the first classification.

Technical advantages of certain embodiments of this disclosure may include one or more of the following. Certain embodiments of this disclosure determine an out-of-date status based on a corpus of devices. Taking corrective measures to ensure that a user's software is up to date may reduce or prevent cyberattacks, which may protect the user's confidential data. As another advantage, outdated software has a higher potential to malfunction. Ensuring that a user's software is up to date may prevent these types of malfunctions, which may increase the user's productivity. As still another advantage, ensuring that a user's operating system is up to date may reduce fragmentation issues resulting from the use of outdated operating systems with updated mobile applications.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for determining an out-of-date status based on a corpus of devices. Certain embodiments of this disclosure determine whether a predetermined threshold of devices associated with a particular manufacturer and model name have been updated to the most recent software version. Once the predetermined threshold is satisfied, the software version associated with most recent software version is updated to reflect the latest available software version for that particular manufacturer and model name.

FIG. 1 illustrates an example system 100 for determining an out-of-date status based on a corpus of devices. System 100 or portions thereof may be associated with an entity, which may include any entity, such as a business, company, or enterprise, that determines an out-of-date status of a device. The components of system 100 may include any combination of hardware, firmware, and software. For example, the components of system 100 may use one or more elements of the computer system of FIG. 4.

In the illustrated embodiment of FIG. 1, system 100 includes a network 110, devices 120 (device 120a through device 120n), and a server 140. Each device 120 of FIG. 1 is associated with a manufacturer 122 (manufacturer 122a through manufacturer 122n), a model name 124 (model name 124a through model name 124n), software 126 (software 126a through software 126n), a current version 128 of software 126 (current version 128a through current version 128n), and applications 130 (application 130a through application 130n). Server 140 is associated with a database 142, a version checker 144, classifications 146 (classifications 146a through classifications 146n), categories 148 (category 148a through category 148n), and latest available versions 150 (latest available versions 150a through 150n) and notifications 152 (notification 152a through notification 152n). In the numerated values above (e.g., 120n), "n" represents any suitable integer.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined WAN (SD-WAN), a metropolitan area network (MAN), a portion of the Public Switched Telephone Network (PSTN), a cellular telephone network, a Digital Subscriber Line (DSL), a Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more physical devices, virtual machines, bare metal servers, and the like. As another example, nodes may include data communications equipment such as computers, routers, servers, printers, workstations, switches, bridges, modems, hubs, and the like. The nodes of network 110 include devices 120 and server 140.

Devices 120 (device 120a through device 120n) of system 100 include any user equipment that can receive, create, process, store, and/or communicate information. Devices 120 may include one or more mobile phones (e.g., smartphones), laptop computers, tablets, personal digital assistants (PDAs), tablets, wearable devices, workstations, desktop computers, etc. In certain embodiments, one or more devices 120 may include a liquid crystal display (LCD), an organic light-emitting diode (OLED) flat screen interface, digital buttons, a digital keyboard, physical buttons, a physical keyboard, one or more touch screen components, a graphical user interface (GUI), and the like. Devices 120 may be located in any suitable locations to receive and communicate information to server 140 of system 100. Devices 120 may include local devices, remote devices, wireless devices, and the like. In certain embodiments, devices 120 are associated with different carriers (e.g., AT&T, Verizon, T-Mobile, Sprint, etc.).

Each device 120 of system 100 is associated with a particular manufacturer 122. For example, device 120a may be associated with manufacturer 122a, device 120b is associated with manufacturer 122a, device 120c is associated with manufacturer 122b, and so on. Manufacturers 122 represent the entity that designs and/or develops devices 120 that are offered for sale to consumers. Manufacturers 122 may design and/or develop the hardware platforms that include one or more components (e.g., chipsets, memory, etc.) purchased from one or more suppliers. Manufacturers 122 may include one or more of the following: Apple, Samsung, Google, Lenovo, Xiaomi, LG, Alcatel networks, and the like. Two or more devices 120 may have the same manufacturer 122 or different manufacturers 122. For example, device 120a through device 120e may be manufactured by Apple, device 120f through device 120p may be manufactured by Samsung, device 120q may be manufactured by Google, and so on.

Each device 120 of system 100 is associated with a particular model name 124. For example, device 120a may be associated with model name 124a, device 120b may also be associated with model name 124a, device 120c is associated with model name 124b, and so on. Model names 124 represent the types or designs of devices 120 released by manufacturers 122. For example, model names 124 released by Apple include iPhone 12, iPhone 12 mini, iPhone 12 Pro, iphone 12 Pro Max, iPhone 13, iPhone 14, Apple Watch Series 8, and the like. As another example, model names 124 released by Samsung include Galaxy A71, Galaxy S33, Galaxy F13, Galaxy A23 5G, Galaxy Watch5 Pro, Galaxy Tab Active4 Pro, and the like. Manufacturers 122 may release certain model names 124 in a series. For example, in its iPhone 11 series, Apple released the following three iphone 11 models: iPhone 1, iphone 11 Pro, and iphone 11 Pro Max.

Each device 120 of system 100 is associated with software 126. Software 126 represents a set of computer programs and associated documentation and data. Software 126 may include system software, application software, firmware, and the like. System software manages hardware behavior and provides basic functionalities that are required by users or for other software to run properly. In certain embodiments, system software provides a platform for running application software. System software may include operating systems, device drivers, server software, utility software, and the like. Operating systems are collections of software that manage resources and/or provide services for other software. Operating systems may include supervisory programs, boot loaders, shells, window systems, etc. Examples of operating systems include Android (for Google), iOS (for Apple), Bada (for Samsung), Blackberry OS (for Research in Motion), Windows OS (for Microsoft), Symbian OS (for Nokia), Tizen (for Samsung), etc.

Application software uses the computer system to perform functions beyond the basic operation of the computer. Application software may include browsers, business software, word processors, databases, video games, etc. A browser is used for accessing websites. In certain embodiments, a browser retrieves files from a web server and renders a page on a user's screen using a built-in browser engine. Firmware provides low-level control for specific hardware on devices 120. Firmware may include basic functions of device 120. In certain embodiments, firmware provides hardware abstraction services to higher-level software (e.g., operating systems). In some embodiments, firmware may act as the complete operating system for one or more devices 120. Firmware may include Basic Input/Output System (BIOS), Unified Extensible Firmware Interface (UEFI)-compliant firmware, Hard disk drive, solid-state drive, and/or optical disc drive firmware, Open Firmware, ARCS, Kickstart, Run-Time Abstraction Services (RTAS), and the like.

Each type of software 126 is associated with one or more versions. A software version is a unique version name and/or unique version number that is assigned to a unique state of computer software. In certain embodiments, version numbers are assigned in increasing order and correspond to new developments in software 126. Software versioning schemes may include sequence-based identifiers (each software release is assigned a unique identifier that consists of one or more sequences of numbers and/or letters), date-based versioning schemes, Python-based version schemes, TeX-based version schemes, Apple-based version schemes, etc. In certain embodiments, versions of software 126 may include one or more patches, patch levels, software updates, and the like.

Software 126 installed on devices 120 of system 100 is associated with current versions 128. For example, software 126a (e.g., iOS) installed on device 120a may be associated with current version 128a (e.g., 16.02), software 126a (e.g., iOS) installed on device 120b may be associated with current version 128b (e.g., 16.03), software 126a (e.g., iOS) installed on device 120c may be associated with current version 128c (e.g., 16.1), and so on. Current version 128 represents the most recent version of software 126 running on device 120. For example, device 120a may run iOS software version 16.0.3, whereas device 120b may run iOS software version 16.0.2. As another example, device 120a may run Android software version 13, whereas device 120b may run Android software version 12.

Applications 130 of system 100 are computer software packages that perform specific functions to determine whether current versions 128 of software 126 installed on devices 120 are up to date. In certain embodiments, one or more applications 130 are mobile applications (also known as mobile apps). Mobile applications are designed to run on mobile devices (e.g., a smartphone, a tablet, a PDA, etc.). Applications 130 may include native applications and/or web applications. Native applications are built for a specific mobile operating system (e.g., iOS or Android), whereas web applications are run through a browser. In the illustrated embodiment of FIG. 1, application 130a is associated with device 120a, application 130b is associated with device 120b application 130c is associated with device 120c, and so on. In certain embodiments, applications 130 of devices 120 communicate information to server 140.

Server 140 of system 100 is a network element (e.g., a computer hardware component, a computer software component etc.) that provides functionality for other programs and/or devices 120. In certain embodiments, server 140 communicates with devices 120 and performs computations for devices 120. In some embodiments, server 140 receives requests from devices 120, performs actions in response to receiving the requests, and communicates responses back to devices 120. For example, server 140 may receive a request from device 120a for an indication of whether current version 128a of software 126a (e.g., iOS) installed on device 120a is up to date. In response, server 140 may determine whether current version 128a of software 126a (e.g., iOS) installed on device 120a is up to date and communicate a response to device 120a indicating whether current version 128a of software 126a (e.g., iOS) installed on device 120a is up to date.

In certain embodiments, server 140 stores information received from devices 120 in database 142. Database 142 of server 140 is an organized collection of data stored and accessed electronically. Database 142 may be stored on a file system, hosted on computer clusters, hosted on cloud storage, and the like. In certain embodiments, database 142 stores information received from devices 120 in an organized manner, as illustrated in FIG. 2.

Version checker 144 of server 140 is a computer software program that analyzes information received from devices 120 to determine whether software 126 installed on devices 120 is up to date. In certain embodiments, version checker 144 receives manufacturer 122, model name 124, software 126, and/or current version 128 of software 126 associated with each device 120 and uses this information to determine whether software 126 installed on devices 120 is up to date.

In certain embodiments, version checker 144 of system 100 generates one or more classifications 146. Classifications 146 are generated according to shared qualities and characteristics. In some embodiments, each classification 146 represents a specific combination of manufacturer 122, model name 124, and/or software 126. For example, classification 146a may represent manufacturer 122a (Apple, Inc.), model name 124a (iPhone 14), and software 126a (iOS), as illustrated in FIG. 2. As another example, classification 146b may represent manufacturer 122b (Samsung Electronics), model name 124b (Galaxy S22), and software 126b (Android), as illustrated in FIG. 2. As still another example, classification 146c may represent manufacturer 122a (Apple, Inc.), model name 124c (iPhone 14 Pro), and software 126a (iOS).

In some embodiments, version checker 144 determines the number of devices 120 in one or more classifications 146. For example, version checker 144 may determine that 200 devices 120 are associated with classification 146*a*, as illustrated in FIG. 2. As another example, version checker 144 may determine that 100 devices 120 are associated with classification 146*b*, as illustrated in FIG. 2. In some embodiments, devices 120 in classifications 146 are associated with different carriers. For example, carriers of devices 120 in classification 146*a* may include two or more of the following carriers: AT&T, Verizon, T-Mobile, and Sprint.

In certain embodiments, version checker 144 categorizes devices 120 in each classification 146 into one or more categories 148. Each category 148 of each classification 146 represents a particular version 128 of software 126. For example, category 148*a* of classification 146*a* may represent current version 128*a* (e.g., Apple's iOS 16.0) as illustrated in FIG. 2. As another example, category 148*b* of classification 146*a* may represent current version 128*b* (e.g., Apple's iOS 16.01), as illustrated in FIG. 2. As still another example, category 148*c* of classification 146*a* may represent current version 128*c* (e.g., Apple's iOS 16.02), as illustrated in FIG. 2. In some embodiments, version checker 144 determines the number of devices 120 in one or more categories 148. For example, version checker 144 may determine that 15 devices 120 are associated with category 148*b*, as illustrated in FIG. 2.

In certain embodiments, version checker 144 ranks current versions 128 of software 126. Version checker 144 may rank current versions 128 of software 126 from a most recent version of software to an oldest version of software, from an oldest version of software to a most recent version of software, and the like. For example, current versions 128 of software 126 may include Apple iOS versions 16.0, 16.01, 16.02, 16.03, and 16.1. Version checker 144 may rank Apple's iOS versions from the oldest version of software to the most recent version of software as follows: 16.0, 16.01, 16.02, 16.03, and 16.1. Version checker 144 may use one or more of the following to rank current versions 128 of software 126: publicly available data, a recurring numbering system associated with a particular manufacturer 122, model name 124, and/or software 126, and the like.

In certain embodiments, version checker 144 determines the number of devices 120 in category 148 associated with the most recent current version 128 of software 126. For example, version checker 144 may determine that category 148*e* (Apple's iOS version 16.1) includes two devices 120, as illustrated in FIG. 2. In some embodiments, version checker 144 compares the number of devices 120 in each classification 146 to the number of devices in category 148 associated with the most recent current version 128 of software 126. For example, version checker 144 may compare 200 devices in classification 146*a* to 2 devices in category 148*e*.

In certain embodiments, version checker 144 determines whether the number of devices 120 in category 148 associated with the most recent current version 128 of software 126 is statistically significant. The number of devices 120 in category 148 associated with the most recent current version 128 of software 126 may be statistically significant if the number of devices 120 in category 148 associated with the most recent current version 128 of software 126 is greater than a predetermined threshold (e.g., 1 device, 5 devices, etc.), if the percentage of devices 120 in category 148 associated with the most recent current version 128 of software 126 as compared to the total number of devices in classification 146 is greater than a predetermined threshold (e.g., 1 percent, 5 percent, etc.), if a p-value associated with the number of devices 120 in category 148 associated with the most recent current version 128 of software 126 is less than 0.05, or any other suitable method.

In certain embodiments, if version checker 144 determines that the number of devices 120 in category 148 associated with the most recent current version 128 of software 126 is statistically significant, version checker 144 replaces latest available version 150 of software 126 with the most recent current version 128 of software 126. For example, if version checker 144 determines that the percentage of devices 120 in category 148*e* (Apple's iOS version 16.1) of classification 146*a* is greater than a predetermined percentage threshold, version checker 144 may replace the currently stored latest available version 150 of software 126 (Apple's iOS version 16.03) with the most recent current version 128 of software 126 (Apple's iOS version 16.1).

In some embodiments, version checker 144 performs one or more actions in accordance with a predetermined schedule. For example, version checker 144 may update latest available versions 150 of software 126 during a predetermined time period (e.g., from midnight to 3:00 am), at predetermined intervals (e.g., daily, weekly, etc.), and the like.

In certain embodiments, server 140 receives information from device 120*a*. Server 140 uses this information (e.g., manufacturer 122*a*, model name 124*a*, software 126*a*, current version 128*a*, etc.) to determine whether device 120*a* is running latest available version 150 of software 126*a*. In certain embodiments, this analysis is performed during authentication of device 120*a*. In some embodiments, server communicates notification 152 to device 120*a* indicating whether device 120*a* is running latest available version 150 of software 126*a*. Notifications 152 may include emails, text messages, push notifications, etc. In certain embodiments, notifications 152 instruct devices 120 to update their software 126 to latest available version 150.

In operation, applications 130 of devices 120 initiate communication of the following information to server 140: manufacturers 122 of devices 120, model names 124 of devices 120, software 126 installed on devices 120, and current versions 128 of software 126 installed on devices 120. Server 140 stores this information in database 142. Server 140 generates classifications 146 for each manufacturer 122/model name 124 combination and determines the number of devices 120 in each classification 146. Sever generates categories for each current version 128 of software 126 associated with each classification 146 and determines the number of devices 120 in each category 148. Server 140 ranks current versions 128 of software from most recent version to oldest version and compares the number of devices 120 in classification 146 to the number of devices in category 148 having the most recent version. If the comparison is statistically significant, version checker 144 updates classification 146 to replace the current latest available version 128 of software 126 the most recent current version 128 of software 126. Version checker 144 performs these steps at a predetermined, recurring time (e.g., nightly).

Application 130*a* of device 120*a* communicates the following information to server 140: manufacturer 122*a* of device 120*a*, model name 124*a* of device 120*a*, software 126*a* installed on device 120*a*, and current version 128*a* of software 126*a* installed on device 120*a*. Server 140 stores a record of this information in database 142. Server 140 determines that classification 146*a* applies to device 120*a* based on manufacturer 122*a*, model name 124*a*, and software 126*a* received from device 120*a*. Server 140 then determines whether device 120*a* is running latest available version 150*a* by comparing current version 128*a* of software 126*a* to latest available version 150*a* of classification 146*a*. Server 140 communicates notification 152 to device 120*a* indicating whether device 120*a* is running latest available version 150*a* of software 126*a*. As such, system 100 determines out-of-date status based on a corpus of devices 120, which may reduce fragmentation of software 126.

Although FIG. 1 illustrates a particular number of systems 100, networks 110, devices 120, manufacturers 122, model names 124, software 126, current versions 128, applications 130, servers 140, databases 142, version checkers 144, classifications 146, categories 148, latest available versions 150, and notifications 152, this disclosure contemplates any suitable number of systems 100, networks 110, devices 120, manufacturers 122, model names 124, software 126, current versions 128, applications 130, servers 140, databases 142, version checkers 144, classifications 146, categories 148, latest available versions 150, and notifications 152.

Although FIG. 1 illustrates a particular arrangement of system 100, network 110, devices 120, manufacturers 122, model names 124, software 126, current versions 128, applications 130, server 140, database 142, version checker 144, classifications 146, categories 148, latest available versions 150, and notifications 152, this disclosure contemplates any suitable arrangement of system 100, network 110, devices 120, manufacturers 122, model names 124, software 126, current versions 128, applications 130, server 140, database 142, version checker 144, classifications 146, categories 148, latest available versions 150, and notifications 152.

Furthermore, although FIG. 1 describes and illustrates particular components, devices, or systems carrying out particular actions, this disclosure contemplates any suitable combination of any suitable components, devices, or systems carrying out any suitable actions.

FIG. 2 illustrates an example database table 200 that may be used by system 100 of FIG. 1. In certain embodiments, database table 200 includes the data stored in database 142 of FIG. 1. For example, when one or more devices 120 of FIG. 1 communicate data to server 140, this data may be stored in database table 200 of database 142. The data in database table 200 is logically organized in a row-and-column format, where each row represents a unique record, and each column represents a field in the record.

In certain embodiments, database table 200 is used to logically organize the following information received from devices 120 of FIG. 1: manufacturers 122, model names 124, software 126, and versions 128 of software 126. The first field (column) of FIG. 2 lists different categories 148 of database table 200. Categories 148 include category 148*a* through 148*g*. The second field (column) of FIG. 2 lists different manufacturers 122 associated with devices 120 of FIG. 1. Manufacturers 122 include manufacturer 122*a* (Apple, Inc.) and manufacturer 122*b* (Samsung Electronics). The third field (column) of FIG. 2 lists different model names 124 associated with devices 120 of FIG. 1. Model names 124 include model name 124*a* (iPhone 4) and model name 124*b* (Galaxy S22). The fourth field (column) of FIG. 2 lists different software 126 associated with devices 120 of FIG. 1. Software 126 includes software 126*a* (Apple's iOS operating system) and software 126*b* (Android's operating system). The fifth field (column) of FIG. 2 lists different versions 128 of software 126 associated with devices 120 of FIG. 1. Versions 128 include version 128*a* (iOS version 16.0), version 128*b* (iOS version 16.01), version 128*c* (iOS version 16.02), version 128*d* (iOS version 16.03), version 128*e* (iOS version 16.1), version 128*f* (Android 12), and version 128*g* (Android 13).

The sixth field (column) of FIG. 2 lists the number of devices 120 of FIG. 1 that are associated with each category 148. For example, as illustrated in the first row of database table 200, four devices are associated with category 148*a*, which includes manufacturer 122*a* (Apple Inc.), model name 124*a* (iPhone 14), software 126*a* (iOS), and version 128*a* (16.0). As another example, as illustrated in the second row of database table 200, 15 devices are associated with category 148*b*, which includes manufacturer 122*b* (Apple Inc.), model name 124*b* (iPhone 14), software 126*b* (iOS), and version 128*b* (16.01).

The seventh field (column) of FIG. 2 lists a different classification 146 for each combination of manufacturer 122, model name 124, and software 126 associated with devices 120 of FIG. 1. For example, classification 146*a* is assigned to a particular combination of manufacturer 122*a* (Apple Inc.), model name 124*a* (iPhone 14), and software 126*a* (iOS). As another example, classification 146*b* is assigned to a particular combination of manufacturer 122*b* (Samsung Electronics), model name 124*b* (Galaxy S22), and software 126*b* (Android).

The eighth field (column) of FIG. 2 lists latest available version 150 associated with each classification 146. In certain embodiments, latest available version 10 is determined by server 140 of FIG. 1. For example, server 140 of FIG. 1 may determine a percentage of devices 120 in category 148*e* (most recent current version 128*e* of software 126*a*) as compared to the number of total devices 120 in classification 146*a*. After a predetermined percentage of devices 120 (e.g., 1 percent, 5 percent, etc.) have installed most recent current version 128*e*, server 140 may replace latest available version 150*a* (version 16.03) to reflect most recent current version 128*e* (version 16.1).

Although FIG. 2 illustrates a particular number of database tables 200 manufacturers 122, model names 124, software 126, versions 128, devices 120, classifications 146, categories 148, and latest available versions 150, this disclosure contemplates any suitable number of database tables 200, manufacturers 122, model names 124, software 126, versions 128, devices 120, classifications 146, categories 148, and latest available versions 150. Although FIG. 2 illustrates a particular arrangement of database table 200 and its associated columns and rows, this disclosure contemplates any suitable arrangement of database table 200 and its associated columns and rows. Although FIG. 2 illustrates the use of a table to organize information in database 142 of FIG. 1, this disclosure contemplates any suitable organization of information. For example, the information in database table 200 may be organized in a chart, a graph, or any other suitable format. Furthermore, although FIG. 2 describes and illustrates particular components, devices, or systems carrying out particular actions, this disclosure contemplates any suitable combination of any suitable components, devices, or systems carrying out any suitable actions.

Figure 3:
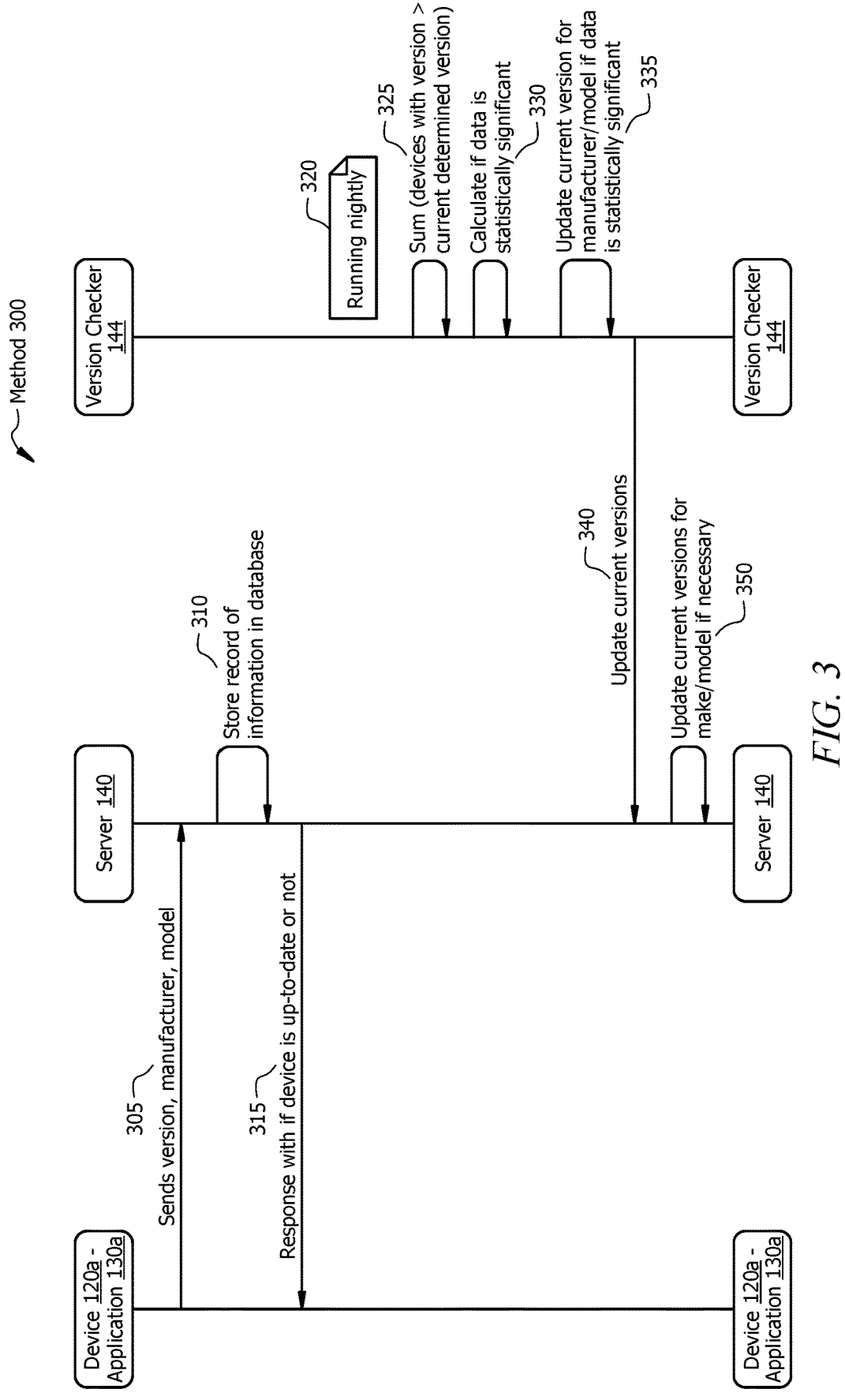
FIG. 3 illustrates a method for determining an out-of-date status based on a corpus of devices, in accordance with certain embodiments.

FIG. 3 illustrates an example method 300 for determining an out-of-date status based on a corpus of devices. FIG. 3 includes steps performed by device 120*a*, server 140, and version checker 144 of FIG. 1. Method 300 begins at step 305, where application 130*a* of device 120*a* communicates the manufacturer of device 120*a*, the model name of device 120*a*, the software installed on device 120*a*, and the current version of software installed on device 120*a* to server 140. For example, referring to FIG. 1, device 120*a* may communicate to server 140 that manufacturer 122*a* of device 120*a* is Apple Inc., that model name 124a of device 120a is iPhone 14, that software 126a of device 120a is iOS, and that current version 128a of software 126a of device 120a is version 16.0. Method 300 then moves from step 305 to step 310.

At step 310 of method 300, server 140 stores the information received from device 120a in its database. For example, referring to FIG. 1, server 140 may store manufacturer 122a (Apple Inc.), model name 124a (iPhone 14), software 126a (iOS), and current version 128a of software 126a (version 16.0) as a record in database 142. Method 300 then moves from step 310 to step 315, where server 140 communicates a response to device 120a indicated whether the software (e.g., operating system) currently running on device 120a is up to date. For example, referring to FIG. 2, server 140 may determine that device 120a belongs in classification 146a, which indicates latest available iOS version 150 of Apple iphone 14 devices is version 16.03. Sever 140 then communicates a response to device 120a indicating whether current version 128a matches latest available iOS version 150a. Method 300 then moves from step 315 to step 320.

At step 320 of method 300, server 140 runs version checker 144 in accordance with a predetermined schedule. For example, server 140 may run version checker 144 every night. At step 325 of method 300, version checker 144 determines the number of devices in each classification that have a current version that is more recent than the latest available version associated with that classification. For example, referring to FIG. 2, version checker 144 may determine that the number (51) of devices 120 in classification 146b running Android 12 is greater than the number (49) of devices in classification 146b running Android 13. Method 300 then moves from step 325 to step 330, where version checker 144 determines whether this difference in the number of devices is statistically significant. For example, referring to FIG. 2, version checker 144 may determine that 49 percent of the devices in classification 146b are running Android 13. If the threshold is greater than 5 percent, then 49 percent would be considered statistically significant. Method 300 then moves from step 330 to step 335.

At step 335 of method 300, version checker 144 updates the latest available version of software for each classification to reflect the most recent current version of software if the difference in the number of devices is statistically significant. Method 300 then moves from step 335 to step 340, where version checker 144 communicates any updates to server 140. At step 340 of method 300, server 140 updates the current software versions for each classification as necessary. As such, method 300 determines out-of-date status based on a corpus of devices 120, which may reduce fragmentation of the software.

Although this disclosure describes and illustrates particular steps method 300 of FIG. 3 as occurring in a particular order, this disclosure contemplates any suitable steps of method 300 of FIG. 3 occurring in any suitable order. Although this disclosure describes and illustrates an example method for determining an out-of-date status based on a corpus of devices including the particular steps of the method of FIG. 3, this disclosure contemplates any suitable method for determining an out-of-date status based on a corpus of devices including any suitable steps, which may include all, some, or none of the steps of the method of FIG. 3, where appropriate. Furthermore, although FIG. 3 describes and illustrates particular components, devices, or systems carrying out particular actions, this disclosure contemplates any suitable combination of any suitable components, devices, or systems carrying out any suitable actions.

Figure 4:
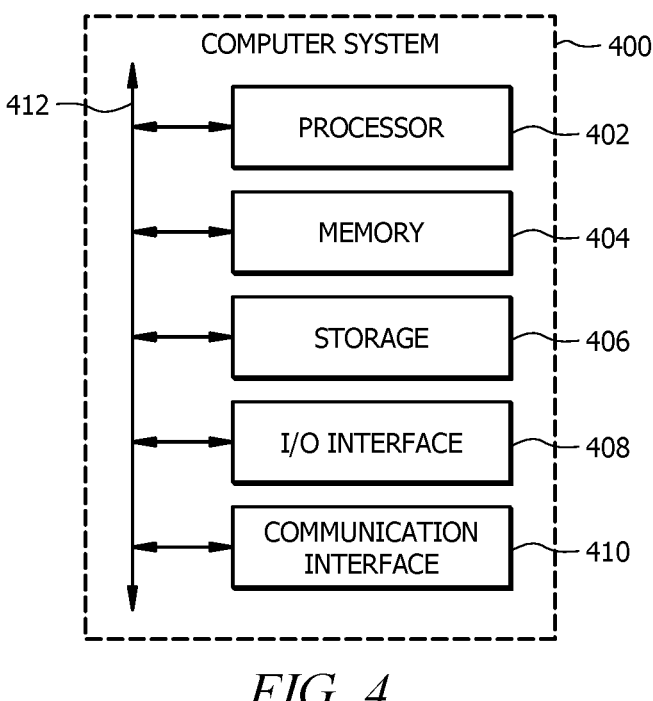
FIG. 4 illustrates a computer system that may be used by the systems and methods described herein, in accordance with certain embodiments.

FIG. 4 illustrates an example computer system 400. In particular embodiments, one or more computer system 400 perform one or more steps of one or more methods described or illustrated herein. In particular embodiments, one or more computer system 400 provide functionality described or illustrated herein. In particular embodiments, software running on one or more computer system 400 performs one or more steps of one or more methods described or illustrated herein or provides functionality described or illustrated herein. Particular embodiments include one or more portions of one or more computer system 400. Herein, reference to a computer system may encompass a computing device, and vice versa, where appropriate. Moreover, reference to a computer system may encompass one or more computer systems, where appropriate.

This disclosure contemplates any suitable number of computer system 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer system 400: be unitary or distributed: span multiple locations: span multiple machines: span multiple data centers: or reside in a cloud, which may include one or more cloud components in one or more networks. Where appropriate, one or more computer system 400 may perform without substantial spatial or temporal limitation one or more steps of one or more methods described or illustrated herein. As an example and not by way of limitation, one or more computer system 400 may perform in real time or in batch mode one or more steps of one or more methods described or illustrated herein. One or more computer system 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406: decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on: the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs): be a multi-core processor: or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate.

In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer system 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network component, comprising:

one or more processors; and one or more computer-readable non-transitory storage media coupled to the one or more processors and storing instructions that, when executed by the one or more processors, cause the network component to perform operations comprising:

receiving information associated with a plurality of devices, wherein the information comprises a manufacturer, a model name, a software, and a current version of the software associated with each device of the plurality of devices;

generating a plurality of classifications for the plurality of devices, wherein each classification of the plurality of classifications is associated with a particular manufacturer, a particular model name, and a particular software;

executing an application in accordance with a predetermined schedule, wherein executing the application comprises:

determining a subset of devices within the plurality of devices that are in a first classification of the plurality of classifications associated with a first manufacturer, a first model name, and a first software;

categorizing the subset of devices in the first classification of the plurality of classifications into a plurality of categories based on the current version of the software for each device within the subset of devices in the first classification of the plurality of classifications;

determining a number of the plurality of devices in a first category of the plurality of categories, wherein the first category of the plurality of categories represents a most recent current version of the software for each device within the subset of devices in the first classification of the plurality of classifications;

generating a comparison of a number of the plurality of devices in the first classification of the plurality of classifications to the number of the plurality of devices in the first category of the plurality of categories;

determining, based on the comparison, that the most recent current version of the software for each device within the subset of devices in the first classification of the plurality of classifications is a latest available version of the software for the subset of devices in the first classification of the plurality of classifications; and associating the latest available version of the software with the subset of devices in the first classification of the plurality of classifications;

determining that the current version of the software of a first device of the plurality of devices in the first classification of the plurality of classifications is different than the latest available version of the software for the subset of devices in the first classification of the plurality of classifications; and communicating a notification to the first device of the plurality of devices indicating that the first device of the plurality of devices is out of date, wherein the notification instructs the first device of the plurality of devices to update the current version of the software of the first device of the plurality of devices to the latest available version of the software for the subset of devices in the first classification of the plurality of classifications.

2. The network component of claim 1, wherein determining that the current version of the software of the first device of the plurality of devices in the first classification of the plurality of classifications is different than the latest available version of the software for the subset of devices in the first classification of the plurality of classifications is performed during authentication of the first device of the plurality of devices.

3. The network component of claim 1, wherein generating the comparison of the number of the plurality of devices in the first classification of the plurality of classifications to the number of the plurality of devices in the first category of the plurality of categories comprises:

determining a percentage of the number of the plurality of devices in the first classification of the plurality of classifications to the number of the plurality of devices in the first category of the plurality of categories; and comparing the percentage of the number of the plurality of devices in the first classification of the plurality of classifications to a predetermined percentage threshold.

4. The network component of claim 1, the operations further comprising determining, based on the information, that the plurality of devices are associated with different carriers.

5. The network component of claim 1, wherein the current version of the software associated with each device of the plurality of devices comprises one or more patch levels.

6. The network component of claim 1, wherein the software is an operating system, a browser, or a firmware.

7. A method, comprising:

receiving information associated with a plurality of devices, wherein the information comprises a manufacturer, a model name, a software, and a current version of the software associated with each device of the plurality of devices;

generating a plurality of classifications for the plurality of devices, wherein each classification of the plurality of classifications is associated with a particular manufacturer, a particular model name, and a particular software;

executing an application in accordance with a predetermined schedule, wherein executing the application comprises:

determining a subset of devices within the plurality of devices that are in a first classification of the plurality of classifications associated with a first manufacturer, a first model name, and a first software;

categorizing the subset of devices in the first classification of the plurality of classifications into a plurality of categories based on the current version of the software for each device within the subset of devices in the first classification of the plurality of classifications;

determining a number of the plurality of devices in a first category of the plurality of categories, wherein the first category of the plurality of categories represents a most recent current version of software for each device within the subset of devices in the first classification of the plurality of classifications;

generating a comparison of a number of the plurality of devices in the first classification of the plurality of classifications to the number of the plurality of devices in the first category of the plurality of categories;

determining, based on the comparison, that the most recent current version of the software for each device within the subset of devices in the first classification of the plurality of classifications is a latest available version of the software for the subset of devices in the first classification of the plurality of classifications; and associating the latest available version of the software with the subset of devices in the first classification of the plurality of classifications;

determining that the current version of the software of a first device of the plurality of devices in the first classification of the plurality of classifications is different than the latest available version of the software for the subset of devices in the first classification of the plurality of classifications; and communicating a notification to the first device of the plurality of devices indicating that the first device of the plurality of devices is out of date, wherein the notification instructs the first device of the plurality of devices to update the current version of the software of the first device of the plurality of devices to the latest available version of the software for the subset of devices in the first classification of the plurality of classifications.

8. The method of claim 7, wherein determining that the current version of the software of the first device of the plurality of devices in the first classification of the plurality of classifications is different than the latest available version of the software for the subset of devices in the first classification of the plurality of classifications is performed during authentication of the first device of the plurality of devices.

9. The method of claim 7, wherein generating the comparison of the number of the plurality of devices in the first classification of the plurality of classifications to the number of the plurality of devices in the first category of the plurality of categories comprises:

determining a percentage of the number of the plurality of devices in the first classification of the plurality of classifications to the number of the plurality of devices in the first category of the plurality of categories; and comparing the percentage of the number of the plurality of devices in the first classification of the plurality of classifications to a predetermined percentage threshold.

10. The method of claim 7, further comprising determining, based on the information, that the plurality of devices are associated with different carriers.

11. The method of claim 7, wherein the current version of the software associated with each device of the plurality of devices comprises one or more patch levels.

12. The method of claim 7, wherein the software is an operating system, a browser, or a firmware.

13. One or more computer-readable non-transitory storage media embodying instructions that, when executed by a processor, cause the processor to perform operations comprising:

receiving information associated with a plurality of devices, wherein the information comprises a manufacturer, a model name, a software, and a current version of the software associated with each device of the plurality of devices;

generating a plurality of classifications for the plurality of devices, wherein each classification of the plurality of classifications is associated with a particular manufacturer, a particular model name, and a particular software;

executing an application in accordance with a predetermined schedule, wherein executing the application comprises:

determining a subset of devices within the plurality of devices that are in a first classification of the plurality of classifications associated with a first manufacturer, a first model name, and a first software;

categorizing the subset of devices in the first classification of the plurality of classifications into a plurality of categories based on the current version of the software for each device within the subset of devices in the first classification of the plurality of classifications;

determining a number of the plurality of devices in a first category of the plurality of categories, wherein the first category of the plurality of categories represents a most recent current version of the software for each device within the subset of devices in the first classification of the plurality of classifications;

generating a comparison of a number of the plurality of devices in the first classification of the plurality of classifications to the number of the plurality of devices in the first category of the plurality of categories;

determining, based on the comparison, that the most recent current version of the software for each device within the subset of devices in the first classification of the plurality of classifications is a latest available version of the software for the subset of devices in the first classification of the plurality of classifications; and associating the latest available version of the software with the subset of devices in the first classification of the plurality of classifications;

determining that the current version of the software of a first device of the plurality of devices in the first classification of the plurality of classifications is different than the latest available version of the software for the subset of devices in the first classification of the plurality of classifications; and communicating a notification to the first device of the plurality of devices indicating that the first device of the plurality of devices is out of date, wherein the notification instructs the first device of the plurality of devices to update the current version of the software of the first device of the plurality of devices to the latest available version of the software for the subset of devices in the first classification of the plurality of classifications.

14. The one or more computer-readable non-transitory storage media of claim 13, wherein determining that the current version of the software of the first device of the plurality of devices in the first classification of the plurality of classifications is different than the latest available version of the software for the subset of devices in the first classification of the plurality of classifications is performed during authentication of the first device of the plurality of devices.

15. The one or more computer-readable non-transitory storage media of claim 13, wherein generating the comparison of the number of the plurality of devices in the first classification of the plurality of classifications to the number of the plurality of devices in the first category of the plurality of categories comprises:

determining a percentage of the number of the plurality of devices in the first classification of the plurality of classifications to the number of the plurality of devices in the first category of the plurality of categories; and comparing the percentage of the number of the plurality of devices in the first classification of the plurality of classifications to a predetermined percentage threshold.

16. The one or more computer-readable non-transitory storage media of claim 13, the operations further comprising determining, based on the information, that the plurality of devices are associated with different carriers.

17. The one or more computer-readable non-transitory storage media of claim 13, wherein the current version of the software associated with each device of the plurality of devices comprises one or more patch levels.

* * * * *